T. P. HASLAM.
VACUUM SERUM EXTRACTOR.
APPLICATION FILED OCT. 30, 1915.
1,212,945.
Patented Jan. 16, 1917.
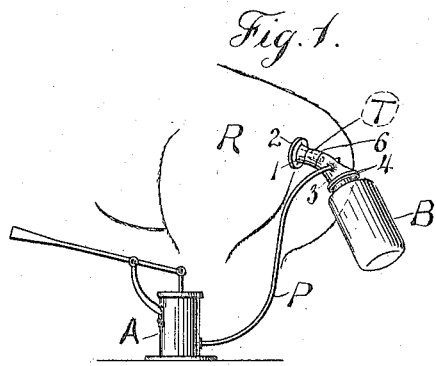
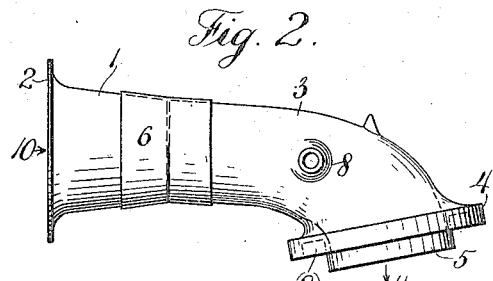
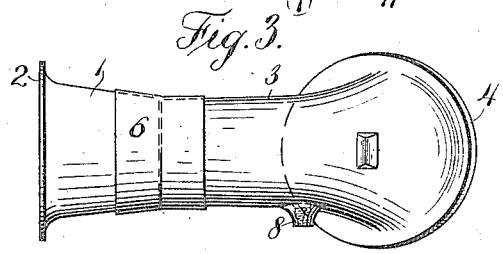
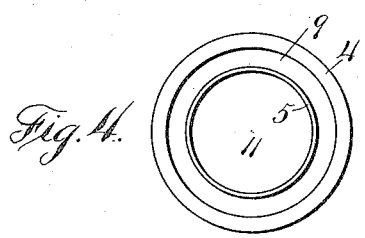
Witnesses
B. I. Auchard.
Allan P. Dixon
Inventor
Thomas P. Haslam
H. M. Stackpole
Attorney.
By
THE NORRIS PETERS CO., PHOTO-LITHO., WASHINGTON, D. C.

UNITED STATES PATENT OFFICE.

THOMAS P. HASLAM, OF MANHATTAN, KANSAS, ASSIGNOR TO THE KANSAS STATE AGRICULTURAL COLLEGE, OF MANHATTAN, KANSAS, A CORPORATION.

VACUUM SERUM-EXTRACTOR.

1,212,945.     Specification of Letters Patent.     Patented Jan. 16, 1917.

Application filed October 30, 1915. Serial No. 58,931.

*To all whom it may concern:*

Be it known that I, THOMAS P. HASLAM, a citizen of the United States, residing at Manhattan, in the county of Riley and State of Kansas, have invented certain new and useful Improvements in Vacuum Serum-Extractors, of which the following is a specification, reference being had to the accompanying drawings, forming a part hereof.

My invention relates to devices for extracting serum impregnated blood from the bodies of animals and the object is to provide a simple and effective device which may be readily applied and easily operated. I attain such object by means of the mechanism hereinafter described and illustrated in the accompanying drawings, in which—

Figure 1 is a view of my invention in position for operation; Fig. 2, a side elevation of my invention; Fig. 3, a plan view of same, and Fig. 4, a plan view of the outer or discharge end of my device as applied to a jar or vessel to receive the fluid.

Similar ordinals of reference indicate like parts throughout the several views.

My invention consists of a tube or funnel, preferably of metal, so constructed as at one end, 4, to snugly fit the mouth of a jar, B, or other vessel to hold the fluid and at the other end, 2, made flaring or cup shaped to fit against the body of the animal, R, from which the fluid is extracted.

For more convenient and effective use I find it advisable to make my device in two parts, 1 and 3, and connect same with an elastic coupling, 6. The neck of the jar or other vessel is placed in the groove or depression 9 encircling the flange 5 which extends into the mouth of the jar with a view to making a close fitting approximately air tight connection. A female threaded opening 8 is provided to which to attach the connecting tube or pipe P of an air exhaust pump A.

My device is shown as applied to the rump of an animal, first severing a portion of the tail T and inserting same in the opening at 10. A jar is attached to the outer end of the device as described and the pump A operated to remove the air from such jar and the interior of the device, thus causing the blood to issue in streams from the lacerated end of the tail through the device; the same being discharged at the opening 11 into the jar B. Such receptacle might be an integral part of my device, but I prefer it separate as described.

Some of the advantages of my device over other methods now in use are that it occasions a continuous flow of fluid without requiring other pressure of the adjacent parts of the body, it also thereby increases the quantity of fluid obtained and doubtless with less pain to the animal operated upon.

I am aware of the patent issued September 19th, 1871, to Orwell H. Needham, Number 119,044 for improvements in combined breast pumps and nursing bottles. To the specific construction therein described and claimed I herein make no claim whatsoever.

What I claim is:

A device of the class described comprising a curved tubular body open at both ends, such open ends being at least as large as the intermediate portions of the body, a mouthpiece at one end adapted to be applied to the body of an animal, and means at the other end for attaching a suitable receptacle, whereby a free open passage between the mouthpiece and receptacle is provided, and an air exhaust pump connected with said tubular body.

THOS. P. HASLAM.

Witnesses:
  G. K. WAGNER,
  JAMES T. LARDNER.

Copies of this patent may be obtained for five cents each, by addressing the "Commissioner of Patents, Washington, D. C."